(12) United States Patent
Koyanagi et al.

(10) Patent No.: US 6,853,109 B2
(45) Date of Patent: Feb. 8, 2005

(54) AXIALLY SLIDING CONTACT TYPE OF A COMMUTATOR, A ROTOR INCLUDING THE COMMUTATOR, AND AN ELECTRIC MOTOR HAVING THE ROTOR

(75) Inventors: Naohisa Koyanagi, Isesaki (JP);
Tetsushi Yashima, Isesaki (JP);
Katsuhito Sohara, Isesaki (JP)

(73) Assignee: Tokyo Parts Industrial Co., LTD (KR)

( * ) Notice: Subject to any disclaimer, the term of this patent is extended or adjusted under 35 U.S.C. 154(b) by 0 days.

(21) Appl. No.: 10/412,546

(22) Filed: Apr. 11, 2003

(65) Prior Publication Data

US 2003/0193262 A1 Oct. 16, 2003

(30) Foreign Application Priority Data

Apr. 11, 2002 (JP) ........................................ 2002-109389

(51) Int. Cl.[7] .............................................. H02K 13/04
(52) U.S. Cl. ........................................ 310/233; 310/81
(58) Field of Search ................................ 310/233, 237, 310/128, 173, 81, 232

(56) References Cited

U.S. PATENT DOCUMENTS

| | | | | | |
|---|---|---|---|---|---|
| 4,533,848 | A | * | 8/1985 | Nakamura | ................... 310/237 |
| 6,246,143 | B1 | * | 6/2001 | Yamaguchi | ................. 310/233 |
| 6,541,891 | B2 | * | 4/2003 | Yamaguchi | ................. 310/268 |

* cited by examiner

*Primary Examiner*—Dang Le
*Assistant Examiner*—Nguyen N Hanh

(57) ABSTRACT

An axially sliding contact type of a commutator which is capable of removing the problem related to a braking loose caused by magnetic force to prevent increase of consumed electricity, has a rotor including the commutator, and an electric motor having the rotor, in which a gap is axially formed. The commutator is of an axially contact type and comprises a plurality of metal plates made of copper and a noble metal layer coated on the metal plates in a state of disposing a separate layer between the metal plates and the noble metal layer. The separate layer is formed of Nickel plating having a non-magnetic property in a non-electrolysis manner.

17 Claims, 3 Drawing Sheets

AXIALLY SLIDING CONTACT TYPE OF A COMMUTATOR, A ROTOR INCLUDING THE COMMUTATOR, AND AN ELECTRIC MOTOR HAVING THE ROTOR

BACKGROUND OF THE INVENTION

1. Field of the Invention

The present invention relates to an electric vibration motor, more particularly to an improvement of an axially sliding contact type of commutator in a flat type of an electric motor which is used as a silent call device of a portable telecommunication apparatus such as a cellular phone, a personal communication system, a pager and the like, while being capable of reducing the problem related to a braking loss thereof caused by a magnetic force.

2. Description of the Related Art

Recently, light-weighting and down-sizing of a portable telecommunication apparatus have been rapidly achieved as a portable telecommunicating technique has been developed continuously. Thus, a flat and compact type of electric vibration motor is widely used as the silent call device in the portable telecommunication apparatus.

The flat and compact type of the electric vibration motor has such a structure in which a flat rotor, a ring-shaped magnet, an axially sliding contact type of brush, and a flat brush base are stacked around a rotor shaft. In the electric vibration motor, the rotor has a flat commutator including a printed circuit installed thereon. In order to generate vibration in the flat type of electric motor, armature coils of the flat rotor should be eccentric to one side, or the numbers of elements of the electric vibration motor should be reduced so that the rotor itself is made eccentric from a central axis of the electric vibration motor. Then, when electricity is supplied from the brush to the commutator to rotate the rotor, the flat rotor rotates while being subjected to an irregular and centrifugal force. The centrifugal force is transmitted from the rotor shaft to the housing to cause the vibration.

In the flat type of electric vibration motor constructed as described above, however, segments of copper plate plated with the noble metal, for example, an alloy based on gold, are utilized as fragments of the flat commutator, in which printed circuits are typically formed. The fragments of the flat commutator are comprised of the copper plate, the noble metal layer, and a separate layer interposed between the copper plate and the noble metal layer. The separate layer, typically Nickel plating, is formed in order to prevent a migration of the copper to the noble metal layer, of which a surface is plated with the noble metal. Herein, the noble metal includes gold, silver, and platinum.

The Nickel plating layer is formed by an electrolysis to be the separate layer, so as to have magnetic property. However, there is a problem in that when the Nickel plating layer having the magnetic property is disposed in a magnetic circuit, the magnetic force of the magnet causes the Nickel plating layer to have a braking loss. Further, where the separate layer is plated on a surface of the copper plate by the electrolysis, the separate layer has an irregular thickness. In plating of Nickel by the electrolysis, it is easy for the corner portions of the fragments of the commutator to become thick. Where the corner portions have non-uniform thickness, the corners of the fragments of the commutator can be easily abraded.

In the aspect of the down-sizing and processing of the flat commutator, the flat commutator and a conductive circuit pattern must be arranged in a magnetic circuit. When the Nickel plating is formed by the electrolysis on the flat commutator or on the conductive pattern, the flat commutator is subjected to intensive magnetic force of the field magnet based on rare-earth element. Thus, this causes a braking loss in the electric vibration motor, resulting in the increase of a consumption of electricity in the electric vibration motor.

SUMMARY OF THE INVENTION

The present invention is contrived to solve the foregoing problem. It is an object of the present invention to provide an axially sliding contact type of commutator which is capable of reducing the problem of a brake loss thereof caused by magnetic force while decreasing consumption of electricity in an electric vibration motor.

It is another object of the present invention to provide a rotor including the axially sliding contact type of commutator which is capable of reducing the brake loss thereof caused by the magnetic force and while decreasing the consumption of the electricity in the electric vibration motor.

It is still another object of the present invention to provide an electric vibration motor having the rotor and the axially sliding contact type of commutator capable of reducing the brake loss.

In order to achieve the first object of the present invention, according to an aspect of the present invention, there is provided an axially sliding contact type of commutator comprising: a plurality of metal plates made of copper; a separate layer which is plated on the metal plates, the separate layer being made of non-magnetic substance; and a plating layer which is coated on the separate layer, the plating layer being formed with noble metal.

In order to achieve the second object of the present invention, according to another aspect of the present invention, there is provided a rotor for an electric motor comprising: a bearing holder which includes a guide portion extending outwardly from a periphery of the bearing holder, for receiving a bearing; a plurality of air-core coils which is mounted on a surface of the guide portion, for generating a rotation force; and a commutator which is mounted on the periphery of the bearing holder, of which a surface comes in close contact with the other surface of the guide portion of the bearing holder, and which comprises: a plurality of metal plates made of copper; a separate layer which is plated on the metal plates, the separate layer being made of non-magnetic substance; and a plating layer which is coated on the separate layer, the plating layer being formed with noble metal.

In order to achieve the third object of the present invention, according to still another aspect of the present invention, there is provided an electric motor comprising: a bracket including a brush base; a magnet which is disposed on the bracket and the brush base; a rotor assembly which is rotatably mounted on the bracket, the rotor assembly including an axially sliding contact type of a commutator; a brush which extends between the brush base and the rotor assembly, for supplying electricity to the rotor assembly; and a case which is combined with the bracket, for covering the rotor assembly.

In the electric vibration motor according to the present invention, the rotor assembly includes: a shaft which is rotatably installed in the bracket; a bearing holder which is mounted on a periphery of the shaft and which includes a guide portion extending outwardly from a periphery of the bearing holder, for receiving a bearing; a plurality of air-core armature coils which is mounted on a surface of the guide portion, for cooperating with the magnet so as to generate a rotation force; and a commutator which is mounted on the periphery of the bearing holder, of which a surface comes in close contact with the other surface of the guide portion of the bearing holder, and which comprises: a plurality of metal plates made of copper; a separate layer which is plated on the metal plates, the separate layer being made of non-magnetic substance; and a plating layer which is coated on the separate layer, the plating layer being formed with noble metal.

In the electric vibration motor, the brush has an end connected to the brush base of the bracket and the other end slidably contacted to the commutator of the rotor assembly, so as to supply the electricity to the air-core armature coils.

According to the present invention, the separate layer includes a Nickel plating layer which is plated on a surface of the copper plate in a non-electrolysis manner.

A printed circuit is formed in the other surface of the copper plate.

With this structure, armature coils are placed on the other surface of the copper plate in which the printed circuit is formed.

Even though the rotor is disposed in a magnetic circuit, the rotor has no brake loss which can be caused by the magnetic force.

In the electric vibration motor according to the present invention, the axially sliding contact type of the commutator has no brake loss due to the magnetic force, so as to reduce a consumption of electricity.

BRIEF DESCRIPTION OF THE DRAWINGS

The above objects and advantages of the present invention will become more apparent by describing in detail the preferred embodiments thereof with reference to the attached drawings, in which.

DETAILED DESCRIPTION OF THE INVENTION

Hereinafter, the axially sliding contact type of the commutator, the rotor including the commutator, and the electric vibration motor having the rotor according to the present invention will be described in more detail with reference to the accompanying drawings.

Figure 1:
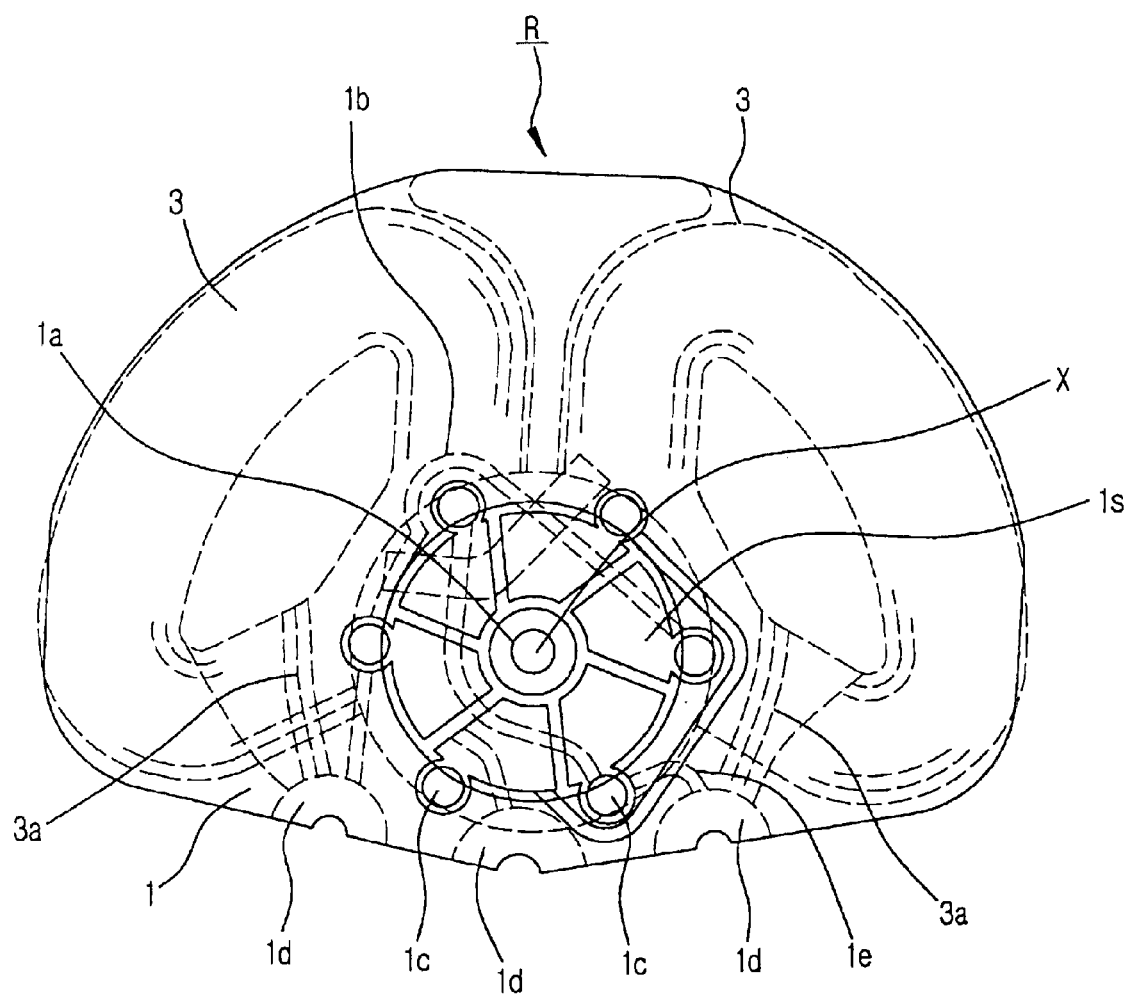
FIG. 1 is a bottom view of a rotor having an axially sliding contact type of commutator according to the present invention.
Figure 2A:
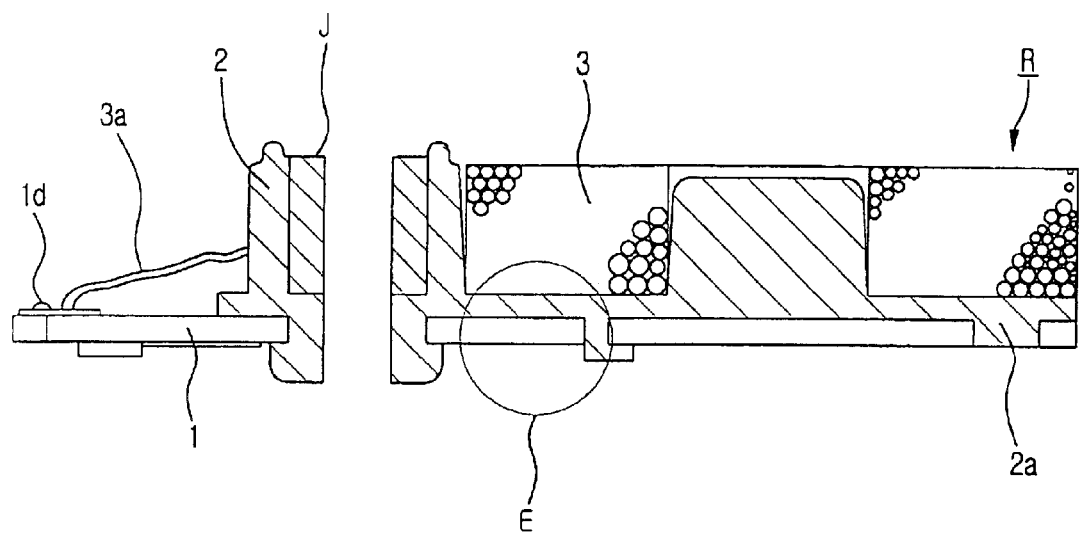
FIG. 2A is a sectional view of the rotor according to the present invention, taken along a line X-Y in FIG. 1, in which important portions of the commutator according to the present invention are shown.
Figure 2B:
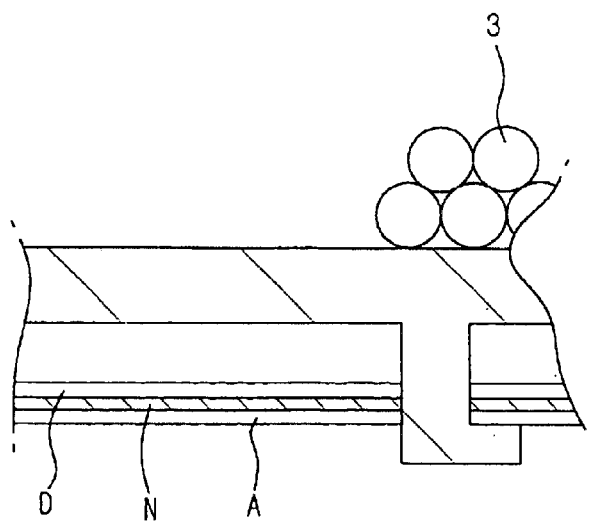
FIG. 2B is an enlarged sectional view of the commutator which is marked in a circle E, according to the present invention.

FIG. 1 is a bottom view of a rotor having an axially sliding contact type of commutator according to the present invention, FIG. 2A is a sectional view of the rotor according to the present invention, taken along a line X-Y in FIG. 1, in which important portions of the commutator according to the present invention are shown, and FIG. 2B is an enlarged sectional view of the commutator which is marked in a circle E, according to the present invention.

Referring to FIGS. 1 to 2B, a reference numeral 1 indicates the axially sliding contact type of the commutator according to the present invention in which a thin printed circuit having a thickness of about 0.1~0.2 mm is formed. The commutator 1 has a shape of wide fan to be used in the electric vibration motor. A thru-hole 1a is formed at a rotating axis of the commutator 1, while commutator figments 1s comprised of six segment patterns are radially formed around the thru-hole 1a on a surface of the commutator 1.

In the commutator figments 1s, the segments are formed in a manner as a copper foil D is etched as a printed circuit in the printed circuit plate, and of which a surface is plated with noble metal A such as gold containing cobalt. A Nickel plating is carried out in such a manner of non-electrolysis Nickel plating N, so called Kanigen plating way, so as to form a separate layer acting as a backing.

In FIGS. 1 to 2B, a reference numeral 1b denotes a conductive pattern making the segments to be subjected to a short-cut through the thru-hole 1c. Since the commutator 1 has a compact size, the conductive pattern also has a Nickel-plated layer which is a separated layer, and a noble metal-plated layer thereon, similarly to the commutator figments 1s.

A bearing holder 2 having a bearing portion J at a center thereof is formed integrally with the axially sliding contact type of the commutator 1, which extends upwardly and downwardly from the commutator 1. A plurality of air-core armature coils 3 is disposed on guide portion 2a to be adjacent to the bearing holder 2.

Three wiring patterns 1d are formed at an edge of the guide portion 2a, to which terminals 3a of the air-core armature coils 3 are connected along with the segment wiring pattern 1e.

A flat rotor R is comprised of the axially sliding contact type of commutator 1, the bearing holder 2 and the air-core armature coils 3 disposed on the guide portion 2a.

Since the Nickel plating according to the conventional art is established by the electrolysis so that the Nickel plating has magnetism, it is similar that a magnetic substance is placed in the magnetic circuit. The latest magnet is made of a rare-earth element to have an intensive magnetic force, resulting in that the rotor according to the conventional art can hardly avoid the brake loss due to the magnetic force. In the commutator according to the present invention, the Nickel plating is formed in a non-electrolysis manner, so as to have non-magnetism. Thus, a copper pattern is formed on a surface of the Nickel plating to reinforce the thin printed circuit.

Figure 3:
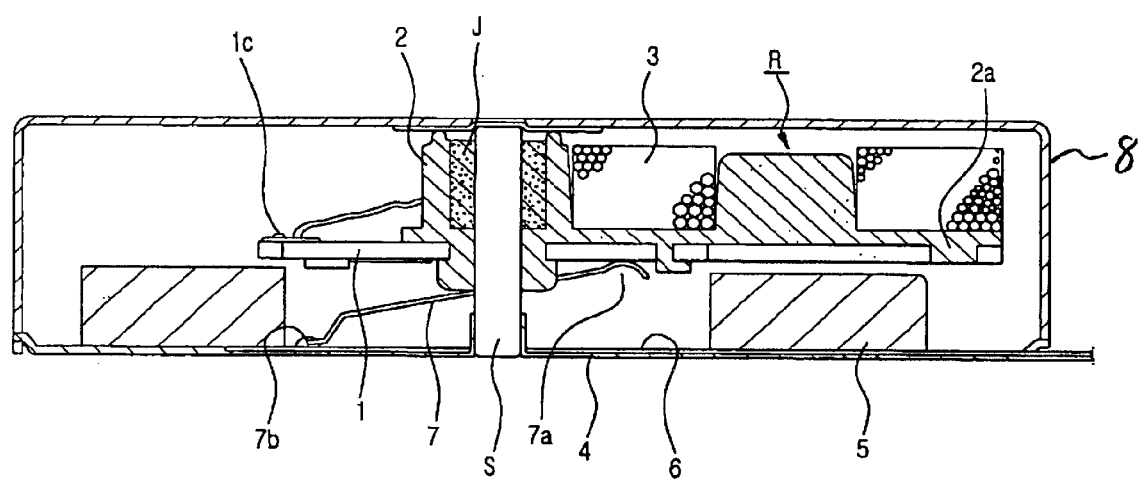
FIG. 3 is a sectional view of an electric motor according to the present invention, in which the electric motor has the rotor according to the present invention.

FIG. 3 is a sectional view of an electric motor according to the present invention, in which the electric motor has the rotor according to the present invention.

The rotor R constructed as described above is adopted in the electric vibration motor as shown in FIG. 3. That is, the electric vibration motor according to the present invention has a case 8 and a bracket 4 as a cover assembly, in which a shaft S is press fitted to the bracket 4. The rotor R is mounted on the shaft S, which rotates in respect to the magnet 5 fixed to the bracket 4 with an axial gap between the rotor R and the magnet 5.

A brush base 6 is installed on the bracket 4, on which an axially sliding contact type of brush 7 is fixed to a base portion 7b. A moving part 7a of the brush 7 comes in slidable contact with the axial sliding type of the commutator 1.

In the electric vibration motor according to the present invention, the commutator fragments and the wiring pattern do not get magnetized so as to reduce the brake loss of the commutator which may be caused due to the magnetic force.

Even though the flat vibration motor is illustrated as an embodiment, furthermore, it is understood by those skilled in the art that the axially sliding contact type of the commutator can be adopted to a typical rotating type of an electric motor if the commutator is disposed within the magnetic circuit.

Even though the printed circuit board is illustrated as the axially sliding contact type of the commutator, it is understood by those skilled in the art that the metal plate based on the copper can be pressed in one piece to be used as the commutator.

In the electric vibration motor having the axially sliding contact type of the commutator which is plated with Nickel in the non-electrolysis manner according to the present invention, additionally, the hardness of the Nickel plating is increased.

As described above, it is possible to provide the axially sliding contact type of commutator which can prevent the brake loss thereof due to the magnetic force.

The separate layer having an even thickness and the non-magnetism can be easily established, of which the hardness increases higher so that the corners of the separate layer can be hardly abraded. Thus, lifetime of the commutator can be improved.

The axially sliding contact type of the commutator can be made by means of printing technology.

Even if the rotor according to the present invention is disposed in the magnetic circuit, the rotor has no brake loss due to the magnetic force.

The electric vibration motor according to the present invention can reduce a consumption of the electricity since the axially sliding contact type of the commutator has no brake loss which can be caused by the magnetic force.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. An axially sliding contact type of commutator comprising:
   a plurality of metal plates made of copper;
   a separate layer which is plated on the metal plates, the separate layer being made of non-magnetic substance; and
   a plating layer which is coated on the separate layer, the plating layer being formed with noble metal.

2. The axially sliding contact type of commutator as claimed in claim 1, wherein the separate layer includes a Nickel plating layer which is plated on a surface of the copper plate in a non-electrolysis manner.

3. The axially sliding contact type of commutator of claim 2, wherein a printed circuit is formed in the other surface of the copper plate.

4. The axially sliding contact type of commutator of claim 1, wherein a printed circuit is formed in the other surface of the copper plate.

5. A rotor for an electric motor comprising:
   a bearing holder which includes a guide portion extending outwardly from a periphery of the bearing holder, for receiving a bearing;
   a plurality of air-core coils which is mounted on a surface of the guide portion, for generating a rotation force; and
   a commutator which is mounted on the periphery of the bearing holder, of which a surface comes in close contact with the other surface of the guide portion of the bearing holder, and which comprises: a plurality of metal plates made of copper; a separate layer which is plated on the metal plates, the separate layer being made of non-magnetic substance; and a plating layer which is coated on the separate layer, the plating layer being formed with noble metal.

6. The rotor for the electric motor of claim 5, wherein the separate layer includes a Nickel plating layer which is plated on a surface of the copper plate in a non-electrolysis manner.

7. The rotor for the electric motor of claim 6, wherein a printed circuit is formed in the other surface of the copper plate.

8. The rotor for the electric motor of claim 5, wherein a printed circuit is formed in the other surface of the copper plate.

9. An electric motor comprising:
   a bracket including a brush base;
   a magnet which is disposed on the bracket and on the brush base; a rotor assembly which is rotatably mounted on the bracket, the rotor assembly including an axially sliding contact type of a commutator; a brush which extends between the brush base and the rotor assembly, for supplying electricity to the rotor assembly; a case which is combined with the bracket, for covering the rotor assembly;
   wherein the rotor assembly includes: a shaft which is rotatably installed in the bracket; a bearing holder which is mounted on a periphery of the shaft and which includes a guide portion extending outwardly from a periphery of the bearing holder, for receiving a bearing; a plurality of air-core armature coils which is mounted on a surface of the guide portion, for cooperating with the magnet so as to generate a rotation force; and a commutator which is mounted on the periphery of the bearing holder, of which a surface comes in close contact with the other surface of the guide portion of the bearing holder, and which comprises: a plurality of metal plates made of copper; a separate layer which is plated on the metal plates, the separate layer being made of non magnetic substance; and a plating layer which is coated on the separate layer, the plating layer being formed with noble metal.

10. The electric motor of claim 9, wherein the brush has an end connected to the brush base of the bracket, and the other end slidably contacted to the commutator of the rotor assembly, so as to supply the electricity to the air-core armature coils.

11. The electric motor of claim 9, wherein the separate layer includes a nickel plating layer which is plated on a surface of the copper plate in a non-electrolysis manner.

12. The electric motor of claim 9, wherein a printed circuit is formed in the other surface of the copper plate.

13. An axially sliding contact type of commutator comprising:
   a plurality of metal plates made of copper;
   a separate layer which is plated on the metal plates, the separate layer including a nickel-based plating layer which is plated on a surface of the copper plate in a non-electrolysis manner; and
   a plating layer which is coated on the separate layer, the plating layer being formed with noble metal.

14. The axially sliding contact type of commutator of claim 13, wherein the nickel-based plating layer is made of a non-magnetic substance.

15. The axially sliding contact type of commutator of claim 14, wherein a printed circuit is formed in the other surface of the copper plate.

16. The axially sliding contact type of commutator of claim 13, wherein a printed circuit is formed in the other surface of the copper plate.

17. An electric motor comprising:

a bracket including a brush base;

a magnet which is disposed on the bracket and on the brush base;

a rotor assembly which is rotatably mounted on the bracket, the rotor assembly including an axially sliding contact type of a commutator;

a brush which extends between the brush base and the rotor assembly, for supplying electricity to the rotor assembly;

a case which is combined with the bracket, for covering the rotor assembly; and wherein the commutator comprises a plurality of metal plates made of copper; a separate layer which is plated on the metal plates, the separate layer being made of non-magnetic substance; and a plating layer which is coated on the separate layer, the plating layer being formed with noble metal.

* * * * *